United States Patent
Matsumoto et al.

(10) Patent No.: US 8,445,149 B2
(45) Date of Patent: May 21, 2013

(54) FUEL CELL SYSTEM AND CONTROL METHOD OF FUEL CELL SYSTEM

(75) Inventors: Yuji Matsumoto, Saitama (JP);
Kenichiro Ueda, Saitama (JP); Junji Uehara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1554 days.

(21) Appl. No.: 11/654,215

(22) Filed: Jan. 17, 2007

(65) Prior Publication Data

US 2007/0166485 A1    Jul. 19, 2007

(30) Foreign Application Priority Data

Jan. 17, 2006  (JP) .................. 2006-009095

(51) Int. Cl.
*H01M 8/06* (2006.01)
*H01M 8/04* (2006.01)

(52) U.S. Cl.
USPC ........... 429/427; 429/410; 429/408; 429/443; 429/512

(58) Field of Classification Search
USPC ................ 429/408, 410, 427, 428, 443, 444, 429/512, 513
See application file for complete search history.

(56) References Cited

U.S. PATENT DOCUMENTS

| | | | |
|---|---|---|---|
| 2004/0062975 A1* | 4/2004 | Yamamoto et al. | 429/34 |
| 2005/0118471 A1* | 6/2005 | Fukuma et al. | 429/22 |
| 2005/0277004 A1* | 12/2005 | Ojima et al. | 429/22 |

FOREIGN PATENT DOCUMENTS

| | | | |
|---|---|---|---|
| EP | 1416567 A2 * | 5/2004 | |
| JP | 2004011674 A * | 1/2004 | |
| JP | 2004-281237 | 10/2004 | |
| JP | 2005116255 A * | 4/2005 | |
| WO | WO 2005/096428 A1 * | 10/2005 | |
| WO | WO 2005112167 A2 * | 11/2005 | |

* cited by examiner

*Primary Examiner* — Edu E Enin-Okut
(74) *Attorney, Agent, or Firm* — Nelson Mullins Riley & Scarborough LLP; Anthony A. Laurentano

(57) ABSTRACT

A fuel cell system includes a diluting apparatus which comprises a first introducing portion, a second introducing portion and an inner space and a discharge portion, and a control unit which comprises discharged fuel gas quantity detection means, a current remaining fuel gas detection means and a purge treatment means. In this fuel cell system purging the fuel gas is controlled calculating a current remaining fuel gas quantity in the inner space based on a fuel gas quantity introduced into the inner space, a flow rate of an oxidizing off-gas, a ventilation rate and a flow rate of a diluting gas.

13 Claims, 5 Drawing Sheets

FUEL CELL SYSTEM AND CONTROL METHOD OF FUEL CELL SYSTEM

CROSS REFERENCE TO RELATED APPLICATION

This application claims the foreign priority benefit under Title 35, United States Code, §119(a)-(c), of Japanese Patent Application No. 2006-009095, filed on Jan. 17, 2006 in the Japanese Patent Office, the disclosure of which is herein incorporated by reference in its entirety.

BACKGROUND OF THE INVENTION

The present invention relates to a fuel cell system and a controlling method of the fuel cell system in which a purged fuel gas (to be referred to as "hydrogen" hereafter) is discharged after it is diluted and its gas concentration becomes below a predetermined level.

In recent years intensive research and development on the fuel cell to be utilized for automobile vehicles have been under way. In a fuel cell which is a principal part of the fuel system, electrical energy is generated from the electro-chemical reaction between hydrogen supplied to an anode and oxidizing gas (to be referred to as "air" hereinafter) supplied to a cathode.

However, since nitrogen gas and water produced on the cathode tend to penetrate to the anode through an electrolyte membrane, the concentration of the hydrogen, which is re-circulated and re-used, lowers gradually. Fuel cell's capability to generate electrical power is dependent on the hydrogen concentration in the anode and degrades when the hydrogen concentration lowers. To prevent fuel cell's capability to generate electrical power from degrading, it is necessary to purge the hydrogen from the cathode, which contains impurities, at appropriate timings. It is also necessary to exhaust the purged hydrogen to the atmosphere after making the concentration of the purged hydrogen below a predetermined level (for instance, approximately 4%) by having the purged hydrogen passed through a dilutor.

Accordingly Japanese Laid Open Application No. 2004-281237 discloses a technique in which the hydrogen concentration is measured with a hydrogen concentration meter on the gas discharged to the atmosphere, a purge valve is controlled according to the measured hydrogen concentration and the hydrogen concentration of the gas discharged to the atmosphere is kept below a predetermined level. However there is a problem with using a hydrogen concentration meter because using a hydrogen concentration meter requires an additional space within a fuel cell system and leads to a cost increase of the fuel cell system and a more complicate assembly process as well.

Therefore a fuel cell system without a hydrogen concentration meter has been developed, in which purging is not allowed if a cumulative quantity of the air which is introduced from the outside atmosphere and flows into a dilutor through fuel cell's cathode exceeds a predetermined air quantity. According to this newly developed fuel cell system, purging is to be automatically done without the hydrogen concentration meter if the hydrogen concentration lowers below a certain level.

However in the case of the fuel cell system without a hydrogen concentration meter, if there is no difference in the cumulative quantity of the air flowing into the dilutor, the decrease in the hydrogen concentration in the dilutor differs between various air flow rates (quantity of air flowing for a unit time). Generally speaking, if the cumulative quantities of the air flowing into the dilutor are identical, the smaller the flowing rate, the quicker the hydrogen concentration decreases.

Hence the predetermined air quantity is set in accordance with a relatively large flow rate of air. However in this case no hydrogen purging is allowed until the quantity of the air flowing into a dilutor reaches a predetermined air quantity and there is a problem that purging can not be efficiently done.

This invention has been completed taking account of the problems above mentioned. Making use of a fuel cell system and a control method of the fuel cell system both of which this invention provides, the fuel gas is to be efficiently purged without using a hydrogen concentration meter and the power generation is to be stabilized.

SUMMARY OF THE INVENTION

A first aspect of the present invention provides a fuel cell system comprising a diluting apparatus comprising a first introducing portion through which a fuel gas to be intermittently purged is introduced, a second introducing portion which branches from an oxidizing off-gas pipe and through which an oxidizing off-gas is introduced as a diluting gas, an inner space where the fuel gas is introduced from the first introducing portion, the oxidizing off-gas is introduced from the second introducing portion and both the fuel gas and the oxidizing off-gas are mixed and become a diluted gas and a discharge portion through which the diluted gas is discharged into the oxidizing off-gas pipe, and a control unit comprising an introduced purged fuel gas quantity detection means for determining an introduced purged fuel gas quantity which is equal to a quantity of the fuel gas purged and introduced from the first introduction portion, a discharged fuel gas quantity detection means for determining a discharged fuel gas quantity to be discharged from the discharge portion, based on a relation between a flow rate of the oxidizing off-gas which flows through the oxidizing off-gas pipe and a ventilation rate equal to a ratio of a quantity of a gas in the inner space that is ventilated, a relation between the flow rate of the oxidizing-off gas which flows through the oxidizing-off gas pipe and a quantity of the diluted gas which is discharged from the inner space and the flow rate of the oxidizing-off gas which flows through the oxidizing-off gas pipe, a current remaining fuel gas quantity detection means for determining a current remaining fuel gas quantity in the inner space, based on the introduced purged fuel gas quantity determined by the introduced purged fuel gas quantity detection means and the discharged fuel gas quantity determined by the discharged fuel gas quantity detection means, and a purge treatment means for controlling at least one of a quantity of the fuel gas to be purged in a following purging operation and a timing of the following purging operation, both of which are to be controlled through a fuel gas purge valve based on the current remaining fuel gas quantity determined by the current remaining fuel gas quantity detection means.

The fuel cell system according to the first aspect enables an appropriate purging operation according to the current remaining fuel gas quantity which is calculated based on the introduced fuel gas quantity, the flow rate of the oxidizing off-gas, the ventilation rate and the flow rate of the diluting gas.

A second aspect of the present invention based on the first aspect provides a fuel cell system, wherein the current remaining fuel gas detection means determines the current remaining fuel gas quantity based on the introduced purged fuel gas quantity determined by the introduced purged fuel gas quantity detection means and a cumulative discharged fuel gas quantity obtained by integrating the discharged fuel gas quantity determined by the discharged fuel gas quantity detection means from a time of a previous purging operation getting started.

The fuel cell system according to the second aspect enables calculating the current remaining fuel cell gas quantity by integrating the discharged fuel gas quantity for each purging operation.

A third aspect of the present invention based on the second aspect provides a fuel cell system, wherein the current remaining fuel gas detection means determines the current remaining fuel gas quantity by subtracting the cumulative discharged fuel gas quantity from a summation of the current remaining fuel gas quantity at a time of the previous purging operation getting started and the introduced purged fuel gas quantity after the previous purging operation getting started.

The fuel cell system according to the third aspect enables calculating the current remaining fuel cell gas quantity by subtracting the cumulative discharged fuel gas quantity from a summation of the introduced fuel gas quantity and the previous remaining fuel gas quantity.

A fourth aspect of the present invention based on the first aspect provides a fuel cell system, wherein the purge treatment means does not allow the following purging operation if the current remaining fuel gas quantity is larger than a predetermined fuel gas quantity.

The fuel cell system according to the fourth aspect enables prohibiting a purging direction to be given to a fuel gas purge valve if the current remaining fuel gas quantity in the dilutor exceeds a predetermined quantity, which is to be regarded as a condition being not appropriate for purging.

A fifth aspect of the present invention based on the first aspect provides a fuel cell system, further comprising a voltage measuring device for measuring a cell voltage of the fuel cell, wherein if the cell voltage measured with the voltage measuring device is lower than a predetermined voltage, the purge treatment means calculates a purgeable fuel gas quantity in the following purging operation to be done based on the current remaining fuel gas quantity and give the fuel gas purge valve a purging direction on the purgeable fuel gas quantity in the following purging operation.

The fuel cell system according to the fifth aspect enables a purging operation of purging the maximum possibly purged fuel gas quantity to be done on detecting a cell voltage which is less than or equal to a predetermined value.

A sixth aspect of the present invention provides a control method for controlling a fuel cell system comprising a diluting apparatus at least comprising an introducing portion through which a fuel gas to be intermittently purged is introduced, an inner space where the fuel gas is introduced and diluted and stays as a diluted gas and a communicating portion with an oxidizing off-gas pipe, through which the diluted gas staying in the inner space is discharged, and a controlling device for controlling a purging operation with a fuel gas purge valve, the control method comprising the steps by the controlling device of determining a ventilation rate of the fuel gas staying in the inner space and a discharged gas quantity equal to a quantity of a gas to be discharged from the inner space, based on a flow rate of an oxidizing off-gas flowing through the oxidizing off-gas pipe, determining a discharged fuel gas quantity equal to a fuel gas to be discharged from the inner space into the oxidizing off-gas pipe, based on the ventilation rate and the discharged gas quantity, determining a current remaining fuel gas quantity in the inner space which is equal to a quantity of the fuel gas staying in the inner space, based on the discharged fuel gas quantity, and controlling a purging operation, based on the current remaining fuel gas quantity.

The control method of fuel cell system according to the sixth aspect enables an appropriate purging operation according to the current remaining fuel gas quantity which is calculated based on the introduced fuel gas quantity, the flow rate of the oxidizing off-gas, the ventilation rate and the flow rate of the diluting gas.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
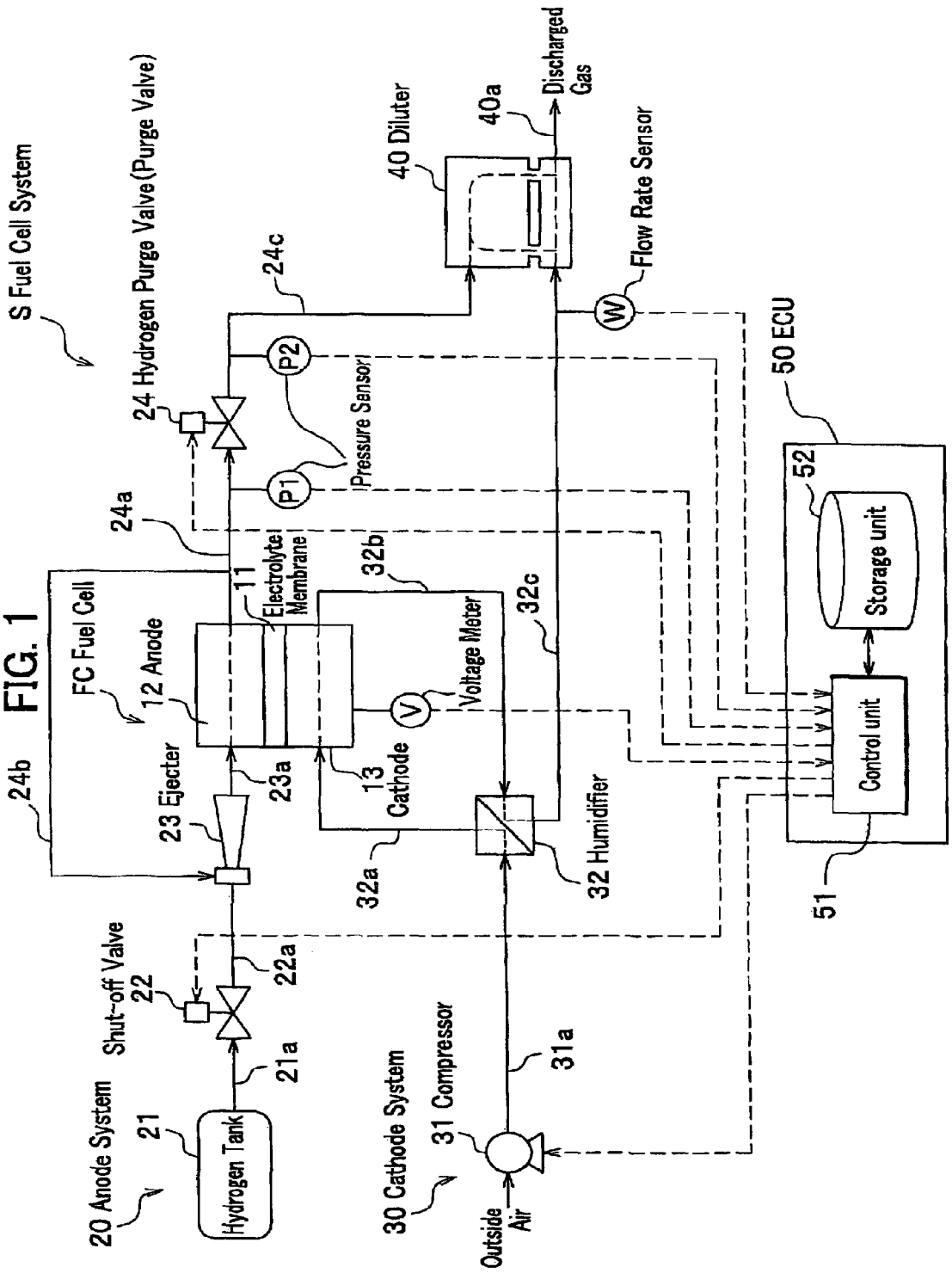
FIG. 1 is a block diagram of a fuel cell system according to the present invention.

An embodiment of the present invention is to be explained hereinafter in detail referring to the figures. FIG. 1 is a block diagram of a fuel cell system according to the present invention. The fuel cell system of the present invention is, for instance, mounted on a fuel cell car. As is shown in FIG. 1, a fuel cell system S comprises a fuel cell FC, an anode system 20, a cathode system 30, a dilutor 40, and an ECU (Electronic Control Unit) 50 (control device).

The fuel cell FC has an electrolyte membrane of a proton exchange type (referred to as "electrolyte membrane" hereinafter) 11 which is in-between an anode 12 and a cathode 13. In FIG. 1, the fuel cell FC is indicated as a single cell. As it is, the fuel cell FC consists of a plurality of single cells stacked together in series.

In the fuel cell FC, hydrogen is supplied to the anode 12 and air (oxygen gas) as an oxidizing gas is supplied to the cathode 13. Electricity is generated through an electrochemical reaction between the hydrogen and the oxygen. The generated voltage of the fuel cell PC (referred to as "cell voltage" hereinafter) is measured with a voltage meter V and the measured voltage signal is sent to a control unit 51 of the ECU 50.

The anode system 20 includes a hydrogen tank 21, a hydrogen supply pipe 21a, a shut-off valve 22; a hydrogen supply pipe 22a, an ejector 23, a hydrogen circulation pipe 23a, a hydrogen purge valve 24 (referred to as "purge valve 24" hereinafter), hydrogen circulation pipes 24a, 24b, a hydrogen discharge pipe 24c and pressure sensors P1, P2. In the anode system 20 hydrogen is supplied and the hydrogen whose concentration is lowered as a result of the anode reaction is intermittently purged from the anode 12.

The hydrogen tank 21 is charged with highly pressurized hydrogen (whose pressure is 350 MPa for instance) and hydrogen is supplied from the hydrogen tank 21 to the hydrogen supply pipe 21a.

It is possible to stop supplying hydrogen from the hydrogen tank 21 to the anode 12 by closing the shut-off valve 22.

The shut-off valve may be provided inside the hydrogen tank 21 as an in-tank valve. Opening and closing the shut-off valve 22 is controlled by the control unit 51 in the ECU 50.

The ejector 23 is provided downstream from the hydrogen supply pipe 22a so that both the hydrogen sent from the hydrogen supply pipe 22a and the hydrogen circulated from the hydrogen circulation pipe 24b are ejected into the hydrogen circulation pipe 23a.

The purge valve 24 is controlled by the control unit 51 in the ECU 50. On opening the purge valve 24 the hydrogen circulation pipes 24a, 24b are purged and the hydrogen therein is discharged into the hydrogen discharge pipe 24c. The pressure sensor P1 is meant for measuring the pressure of the hydrogen circulation pipe 24a and the pressure sensor P2 for the hydrogen discharge pipe 24c. The measured pressure signal is sent to the control unit 51 in the ECU 50.

The cathode system 30 includes a compressor 31, an air supply pipe 31a, a humidifier 32, an air supply pipe 32a, an air discharge pipe 32b, an air discharge pipe 32c (oxidizing off-gas pipe) and a flow rate sensor W. In the cathode system 30, air is supplied to the cathode 13 and discharged from the cathode 13.

The compressor 31 may be such a super-charger as is driven by a motor and is controlled by the control unit 51 in the ECU 50. The compressor 31 compresses air and supplies the compressed air to the cathode 13 through the air supply pipe 31a.

The humidifier 32 humidifies the air supplied from the air supply pipe 31a and supply the humidified air to the air supply pipe 32a, making use of the air coming from the air discharge pipe 32b after discharged from the cathode 13 (cathode off-gas (oxidizing off-gas)), whose humidity is high.

The flow rate sensor W is provided in the air discharge pipe 32c and measures the flow rate of the air (flowing air quantity for a unit time) and the measured flow rate signal is sent to the control unit 51 in the ECU 50.

The dilutor 40 mixes the hydrogen discharged through the hydrogen discharge pipe 24c with the air supplied through the air discharge pipe 32c so that the hydrogen concentration of the mixed gas lowers equal to or to less than a predetermined value (for instance, 4%). Details are to be given together with an explanation in FIG. 2.

There may be a cooling measure not shown for cooling the fuel cell FC by radiating the generated heat which the power generation of the fuel cell FC entails. The cooling measure can be, for instance, such as a cooling medium circulation pipe, a radiator and a circulation pump.

The ECU 50 includes the control unit 51 and a storage unit 52. The control unit 51 consists of such a device as CPU. The ECU 50 controls the shut-off valve 22, the hydrogen purge valve 24 and the compressor 31 and receives the measured signals from the pressure sensors P1, P2, the voltage meter V and the flow rate sensor W. The storage unit 52 comprises ROM (Read Only Memory) and RAM (Random Access Memory) and stores several control programs and various data.

Figure 2:
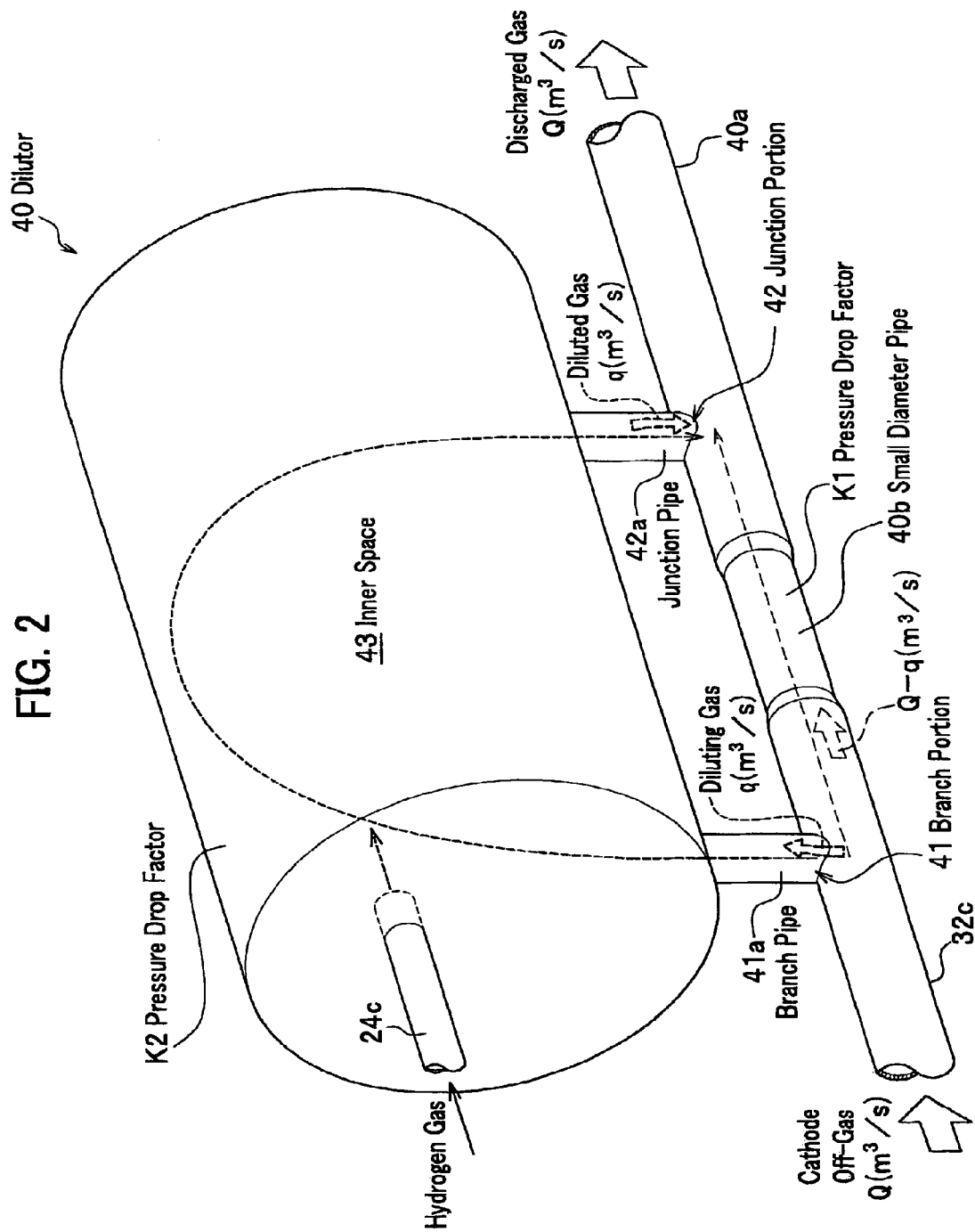
FIG. 2 is a figure showing a perspective view of a dilutor.

Hereinafter an explanation is given on the dilutor 40 with reference to FIG. 2 (and FIG. 1 when necessary). FIG. 2 indicates the construction of the dilutor 40 used in the present invention. The dilutor 40 is more or less a cylindrical shape in FIG. 2 and can be a rectangular parallelepiped shape or other different shapes. It is possible to have a partition plates attached inside the dilutor 40, which function to make the gas passage longer to mix well hydrogen gas and air both introduced inside.

There is an inner space 43 inside the dilutor 40. Hydrogen gas is supplied to the inner space 43 from the hydrogen discharge pipe 24c. There are several pipes such as air discharge pipe 32c, small diameter pipe 40b and diluted gas discharge pipe 40a, which are attached under the dilutor 40. There is a branch portion 41 on the air discharge pipe 32c where the branch pipe 32c branches and a branch pipe 41a is connected, with which the dilutor 40 is connected. There is a junction portion 42 on the diluted gas discharge pipe 40a where a junction pipe 42a joins the diluted gas discharge pipe 40a. The connection portion between the branch pipe 41a and the dilutor 40 corresponds to the second introduction portion.

There is a hole formed at each of the branch portion 41 and the junction portion 42, through which gas can be introduced or discharged. The small diameter pipe 40b is between the air discharge pipe 32c and the diluted gas discharge pipe 40a and has an inner diameter smaller than those of the air discharge pipe 32c and the diluted gas discharge pipe 40a.

The cathode off-gas which is to be the diluting gas flows in the air discharge pipe 32c (flow rate Q ($m^3$/s)). Part of the cathode off-gas as the diluting gas (flow rate q ($m^3$/s)) flows through the branch pipe 41a into the inner space 43 in the dilutor 40 due to the pressure drop effect of the small diameter pipe 40b. The remainder of the cathode off-gas (flow rate Q−q ($m^3$/s)) flows straight through the air discharge pipe 32c.

The diluting gas (flow rate: q ($m^3$/s)) flowing from the branch pipe 41a into the inner space 43 is mixed with the hydrogen gas flowing from the hydrogen purge pipe 24c into the inner space 43, becomes the diluted gas (flow rate is estimated to be q ($m^3$/s )), which is to be explained hereafter. This diluted gas can be referred to as "discharge gas".) and flows through the junction pipe 42a and the junction portion 42 into the diluted gas discharge pipe 40a.

Since the flow rate of the diluting gas is small compared with the volume of the inner space 43 and the inner space 43 is sufficiently spacious to take in all the hydrogen gas coming inside as a result of hydrogen purging, the flow rate of the diluted gas may be regarded as the flow rate of the diluting gas (the flow rate of the gas flowing in and out of the inner space 43 is q ($m^3$/s )).

In this construction a pressure drop factor of the small diameter pipe 40b for the gas (cathode off-gas) passing through the pipe from the branch portion 41 to the junction portion 42 is denoted by K1 and the pressure drop factor of the inner space 43 for the gas (cathode off-gas) passing through the inner space 43 is denoted by K2. Then the following equation (1) holds based on the relation, (Pressure Drop)= (Pressure Drop Factor)×(Flow Rate)$^2$, $$K1 \times (Q-q)^2 = K2 \times q^2 \quad (1)$$

Both pressure drop factors K1, K2 are dependent on such factors as shape of the dilutor 40, shape of the pipes, the cross sectional area of the small diameter pipe 40b and the opening areas of the branch portion 41 and the junction portion 42 and can be determined based on experiments and stored in the storage unit 52 in advance.

Accordingly since both pressure drop factors K1, K2 are known beforehand, the flow rate of the diluting gas q ($m^3$/s ) is determined without attaching a flow rate sensor inside the dilutor 40 only if the flow rate of the cathode off-gas Q ($m^3$/s ) is determined.

In the vicinity of the junction portion 42 the gas flowing straight (whose flow rate is Q−q ($m^3$/s )) is joined by the diluted gas inclusive of hydrogen gas (whose flow rate is q ($m^3$/s )) and discharged to the outside as discharged gas (whose flow rate is is Q ($m^3$/s )).

Figure 3:
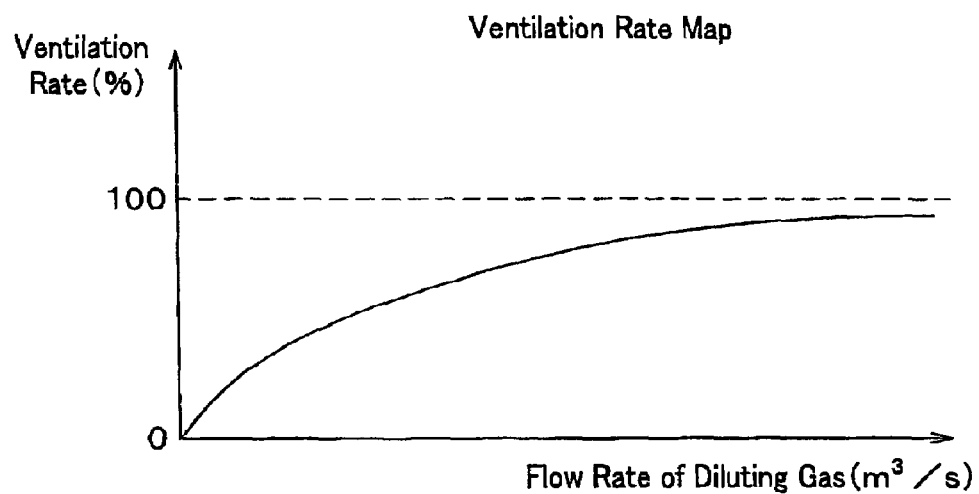
FIG. 3 is a figure exemplifying a ventilation rate map.

An explanation is given next on the ventilation map indicating the relation between the flow rate of the diluting gas and the ventilation rate with reference to FIG. 3 (also FIG. 1 and FIG. 2 if necessary).

The ventilation rate is defined hereinafter as how much portion of a gas in a space is replaced for a predetermined time interval. For instance, when the hydrogen gas concentration is 100% in the beginning if the ventilation rate of the hydrogen gas in a space is 50%, the hydrogen concentration changes to be 50%, 25%, 12.5%. 6.25% . . . every time a predetermined time interval elapses. This ventilation map is stored in the storage unit 52 in the ECU 50.

This ventilation map is experimentally made based on experiments in advance. In the experiments a unit time interval (for instance one hundredth second) is determined (unit time interval determination) and both the flow rate of the diluting gas flowing into the inner space 43 and the ventilation rate of the inner space 43 are measured for a unit time interval. The ventilation rate of the inner space 43 is measured with a hydrogen sensor placed in the vicinity of the junction portion. For various flow rates of the diluting gas this experiment is carried out and the ventilation map is made at the end. As indicated in FIG. 3, the larger the flow rate of the diluting gas, the higher the ventilation rate.

Figure 4:
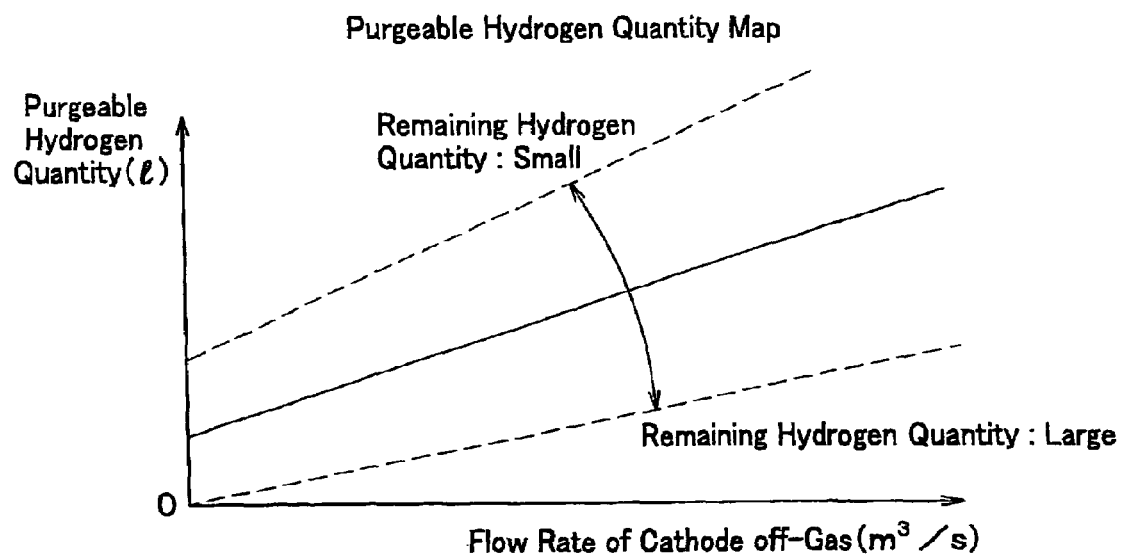
FIG. 4 is a figure exemplifying a possible hydrogen purged quantity map.

An explanation is given on the purgeable hydrogen quantity map indicating the relation between the flow rate of the cathode off-gas and the hydrogen quantity possibly purged one time by a hydrogen purge valve (purgeable hydrogen quantity) with reference to FIG. 4 (FIG. 1 and FIG. 2 as well if necessary). FIG. 4 shows the purgeable hydrogen quantity.

There is an upper limit to the hydrogen quantity the inner space 43 can accommodates, which is dependent not only on the remaining hydrogen quantity in the inner space 43 (remaining hydrogen quantity), but also on the flow rate of the cathode off-gas. Accordingly it is possible to determine the relation between the remaining hydrogen quantity, the flow rate of the cathode off-gas and the purgeable hydrogen quantity by performing tests under various conditions. The purgeable hydrogen quantity map is stored in the storage unit 52 in the ECU 50.

According to the purgeable hydrogen quantity map shown in FIG. 4, the horizontal axis indicates the flow rate of the cathode off-gas and the vertical axis indicates the purgeable hydrogen quantity. As understood in FIG. 4, the larger the flow rate of the cathode off-gas, the more the purgeable hydrogen quantity, and the more the remaining hydrogen quantity, the less the purgeable hydrogen quantity.

Figure 5:
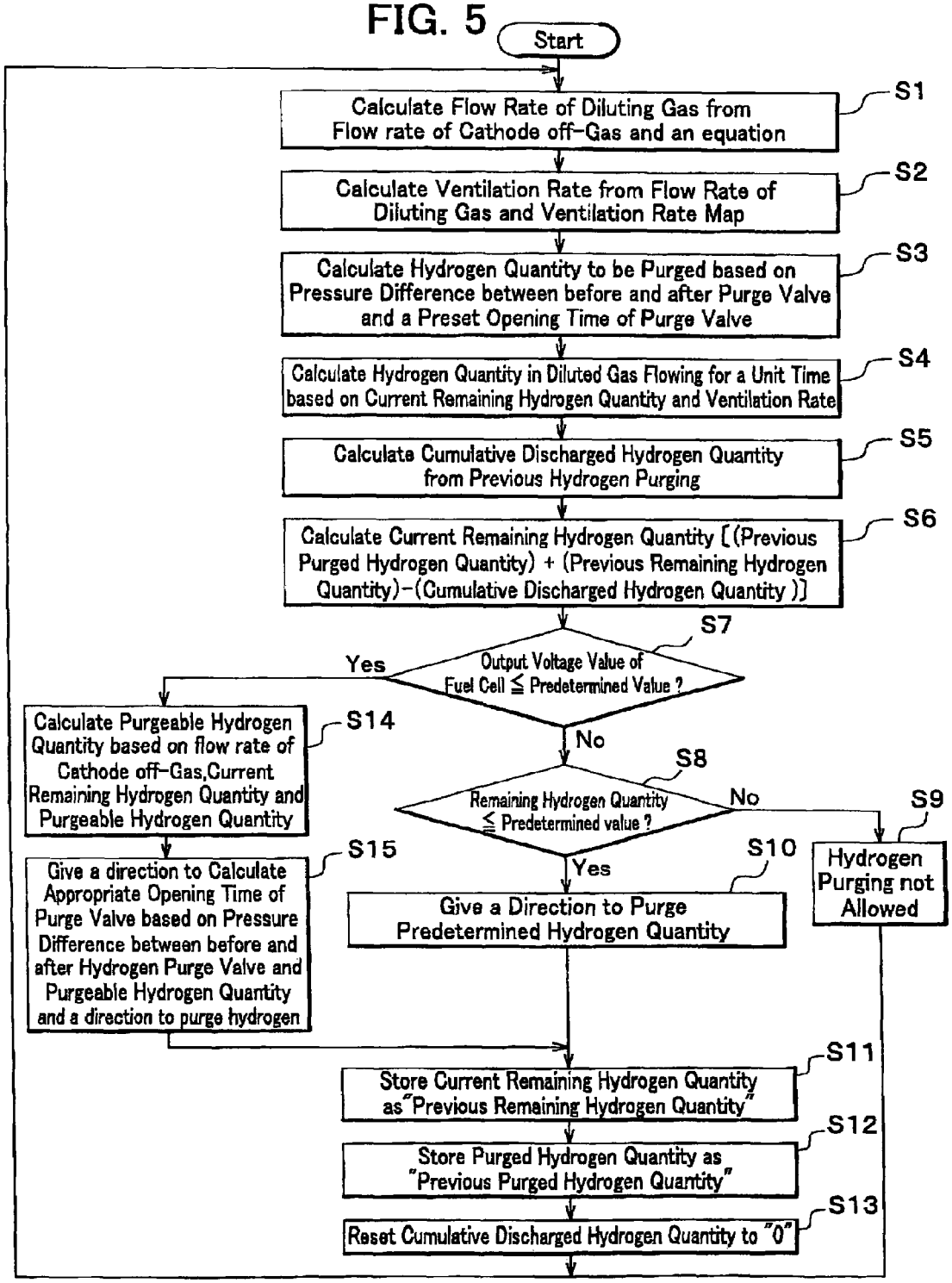
FIG. 5 is a time chart showing a process controlled by a control device when purging is done.

Next looking at FIG. 5 (also FIG. 1 to FIG. 4 if necessary), an explanation is given on the procedures of hydrogen purging by the control unit 51 in the ECU 50.

Firstly the control unit 51 calculates the flow rate of the diluting gas, q (m$^3$/s), which flows into the inner space 43 from the branch portion 41 (Step S1), based on the flow rate of the cathode off-gas flowing through the air discharge pipe 32$c$, Q (m$^3$/s) (which is measured by the flow rate sensor W) and the equation (1). Thus it is possible to obtain the flow rate of the diluting gas and the flow rate of the diluted gas, q (m$^3$/s) without attaching a flow rate sensor inside the dilutor 40.

Then the control unit 51 calculates the ventilation rate of the inner space 43 (Step 2) based on the flow rate of the diluting gas, q (m$^3$/s) and the ventilation map (as seen in FIG. 3) stored in the storage unit 52. In this step it is possible to estimate the ventilation rate of the inner space 43 without attaching a hydrogen concentration sensor inside the dilutor 40.

Next the control unit 51, which is a detection means for the introduced fuel gas quantity, calculates the hydrogen quantity to be discharged (Step S3) based on the pressure difference between before and after the hydrogen purge valve 24 (difference between a pressure signal from the pressure sensor P1 and a pressure signal from the pressure sensor P2) and a predetermined valve opening time of the hydrogen purge valve 24.

Next the control unit 51, which is a detection means for the introduced fuel gas quantity, calculates the hydrogen quantity included in the diluted gas flowing into the diluted gas discharge pipe 40$a$ from the junction portion 42 for a unit time (for instance one hundredth second if the whole procedure takes one hundredth second)(Step 4), making use of the ventilation rate calculated in Step 2, a unit time and the previous remaining hydrogen quantity (calculated in Step S11 in a previous cycle).

Next the control unit 51, which is a detection means for the introduced fuel gas quantity, calculates the cumulative discharged hydrogen quantity, the total hydrogen quantity discharged from the dilutor 40, by adding the hydrogen quantity obtained in Step S4 to the previous cumulative discharged hydrogen quantity (Step S5).

Next the control unit 51, which is a detection means for the introduced fuel gas quantity, calculates the current remaining hydrogen quantity by making a summation of the previous remaining hydrogen quantity (calculated in Step 1 in a previous cycle) and the previous purged hydrogen quantity (calculated in Step S12 in a previous cycle) and subtracting the cumulative discharged hydrogen quantity obtained in Step 5 from the summation (Step S6).

In the above mentioned way the current remaining hydrogen quantity is obtained without attaching a sensor to detect the current remaining hydrogen quantity inside the dilutor 40.

Then the control unit 51 (voltage detecting means) determines if the voltage value of the fuel cell FC (cell voltage) obtained from the voltage meter V is less than or equal to a predetermined value (predetermined voltage) stored in the storage unit 52 (Step S7).

If the voltage value is more than a predetermined value (which corresponds to "No" in Step S7), the fuel cell FC is considered to be working in the normal way and the control unit 51 performs the ordinary procedures in Step S8 and the steps followed by Step S8.

In Step S8 the control unit 51 determines if the current remaining hydrogen quantity calculated in Step S6 is less than or equal to a predetermined value (for instance one liter) stored in the storage unit 52. In this step the predetermined value is chosen to be an appropriate value based on which the ordinary hydrogen purging is done by opening the hydrogen purge valve 24.

If the current remaining hydrogen quantity is more than the predetermined value (which corresponds to "No" in Step S8), the current remaining hydrogen quantity in the dilutor 40 is so much that the dilutor 40 is not considered to be in the condition fit for hydrogen purging. Accordingly the control unit 51 (purge treatment means) prohibits hydrogen purging, does not give a direction to perform hydrogen purging to the hydrogen purge valve 24 (Step S9) and gets back to Step S1.

If the current remaining hydrogen quantity is less than or equal to the predetermined value (which corresponds to "Yes" in Step S8), the current remaining hydrogen quantity in the dilutor 40 is so small that the dilutor 40 is considered to be in the condition fit for hydrogen purging. Then the control unit 51 (purge treatment means) gives a direction to purge a scheduled hydrogen quantity calculated in Step S3 to the hydrogen purge valve 24 (Step S10).

After Step S10 the control unit 51 stores the current remaining hydrogen quantity as "a previous remaining hydrogen quantity" in the storage unit (Step S11) and the purged hydrogen quantity in Step S10 as "a previous purged hydrogen quantity" (Step S12). Furthermore the control unit 51 resets the cumulative discharged hydrogen quantity to "0" (Step S13).

If the voltage value of the fuel cell FC is less than or equal to the predetermined value in Step S7 (Yes), then the fuel cell FC is considered to be not working in the ordinary condition and to be in need of hydrogen purging to reinstate the fuel cell FC to the ordinary condition by blowing out water inside the fuel cell. Furthermore the control unit 51 proceeds to Step S14 and Step S15 to take emergency measures.

In Step S14 the control unit 51 (purge treatment means) calculates a purgeable hydrogen quantity making use of the flow rate of the cathode off-gas obtained from the flow sensor W, the current remaining hydrogen quantity calculated in Step S6 and the purgeable hydrogen quantity map shown in FIG. 4.

Thereafter the control unit 51 (purge treatment means) calculates an opening time for the hydrogen purge valve to purge the hydrogen of a purgeable hydrogen quantity based on the pressure difference between before and after the hydrogen purge valve 24 (difference between a pressure value obtained from the pressure sensor P1 and a pressure value obtained from the pressure sensor P2) and purgeable hydrogen quantity calculated in Step S14, and gives a direction of purging for the calculated opening time to the hydrogen purge valve 24 (Step S15). In this step the larger the inner volume of the dilutor, the larger the purgeable hydrogen quantity.

According to the above mentioned procedures, it is possible to implement immediately the purging treatment of a purgeable hydrogen quantity when the fuel cell FC has to be purged in case of emergency. As a result it is possible to have the fuel cell FC get back to the ordinary condition and work in the ordinary condition.

After Step 15 the control unit 51 performs the procedures from Step S11 to Step S13 which are already mentioned and returns to Step S1.

Figure 6:
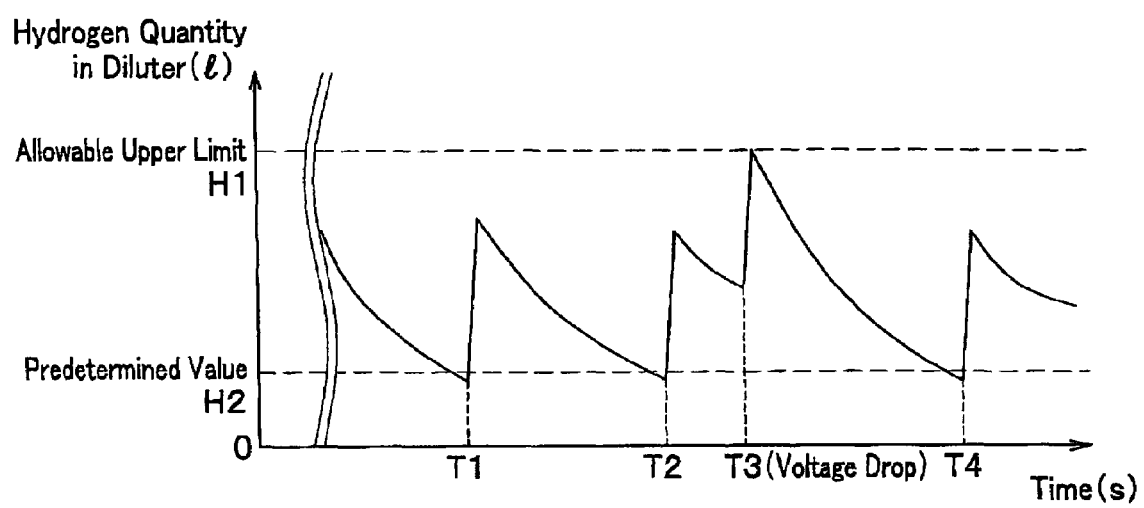
FIG. 6 is a time chart exemplifying changes in hydrogen quantity as time elapses in an inner space of a dilutor.

Next, having a look at the time chart indicated in FIG. 6 (also FIG. 1 to FIG. 5 when necessary), the change in the current hydrogen quantity in the inner space 43 of the dilutor 40, if the control unit 51 perform the procedures in FIG. 5, is to be explained. FIG. 6 is a time chart indicating change in hydrogen quantity in the inner space.

In the time chart in FIG. 6 the horizontal axis indicates time (s) and the vertical axis indicates the hydrogen quantity (1) in the inner space 43 of the dilutor 40.

In the vertical axis indicating the hydrogen quantity, an allowable upper limit value H1 is an upper limit of the hydrogen quantity the dilutor 40 can accommodates and a predetermined value H2 is the same as a predetermined value in Step S8 in the flow chart of FIG. 5 (hereinafter "In the flow chart of FIG. 5" is omitted and simply "in Step S n)

Before time T1 the hydrogen quantity in the inner space 43 is larger than the predetermined value H2 ("No" in Step 58) and the control unit 51 repeats the procedures between Step S1 and Step S9 so that the hydrogen quantity in the inner space 43 gradually decreases.

At time T1 the hydrogen quantity in the inner space 43 becomes smaller than the predetermined value H2 and then the control unit 51 takes a determination of "Yes" in Step S8. The control unit 51 gives a direction to perform hydrogen purging in Step S10 to the hydrogen purge valve 24 so that hydrogen purge valve 24 performs hydrogen purging. As a result the hydrogen quantity in the inner space 43 increases quick.

Afterward the control unit 51 again repeats the procedures between Step S1 and Step S9 so that the hydrogen quantity in the inner space 43 gradually decreases. Then at time T2 hydrogen purging is performed the same way as at time T1 so that he hydrogen quantity in the inner space 43 increases quick.

After time T2 the control unit 51 repeats the procedures between Step S1 and Step S9 and at time T3 when the cell voltage of the fuel cell FC drops below a predetermined value, then the control unit 51 takes a determination of "Yes" in Step S7, proceeds to Step S14 and gives a direction to perform hydrogen purging to the hydrogen purge valve 24.

The hydrogen purge valve given the direction by the control unit 51 opens its valve and performs hydrogen purging so that the hydrogen quantity in the inner space 43 becomes the allowable upper limit H1.

After this operation the control unit 51 repeats the procedures between Step S1 and Step S9 and hydrogen purging is performed at time T4 the same way as at time T1.

As has explained, the fuel cell system S of the present invention can improve the stability of the power generation without attaching a hydrogen concentration sensor and a flow rate sensor inside the dilutor 40 by calculating the current remaining hydrogen quantity and purging the appropriate quantity of hydrogen which is commensurate with the current remaining hydrogen quantity.

Furthermore based on a couple of pressure drop factors on a couple of the cathode off-gas passages and the flow rate of the cathode off-gas the flow rate of the diluting gas and the flow rate of the diluted gas are calculated with good accuracy.

According to this invention, hydrogen purging can be implemented at a shortest interval, by performing purging when the current remaining hydrogen quantity becomes smaller than a predetermined value. Furthermore if the cell voltage of the fuel cell FC becomes lower than a predetermined value, a maximum purgeable quantity of hydrogen is purged immediately so that the fuel cell can recover its power generation capacity quick.

The embodiment of the present invention has been explained, however the embodiment of the present invention is not limited to what has been explained. For instance, the fuel gas used for the present invention is not necessarily hydrogen and other gases such as methane gas can be applied to the present invention. The unit time, for which one hundredth second is used in the above mentioned explanation, can be other time interval than one hundredth second. If another time interval is adopted for the unit time, the ventilation rate map in FIG. 3 should be adjusted according to the unit time adopted.

Furthermore according to the construction of the dilutor 40 shown in FIG. 2 there are a couple of connection portions between the pipe for the cathode off-gas flowing therethrough and the dilutor 40, however it is possible for there to be only one connection portion through which the hydrogen inside the dilutor 40 is sucked out as the cathode off-gas is flowing.

Other modifications are also possible as long as they are within the scope of the present invention.

The invention claimed is:
1. A fuel cell system comprising:
a diluting apparatus comprising:
a first introducing pipe through which a fuel gas to be intermittently purged is introduced;
a second introducing pipe which branches from an pipe assembly and through which an oxidizing off-gas is introduced as a diluting gas, wherein:

a first portion of the oxidizing off-gas flows through the pipe assembly following a first flow path and is discharged from the pipe assembly, and a second portion of the oxidizing off-gas flows through the second introducing pipe following a second flow path;

an inner space where the fuel gas is introduced from the first introducing pipe, the oxidizing off-gas is introduced from the second introducing pipe and both the fuel gas and the oxidizing off-gas are mixed and become a diluted gas;

a third introducing pipe through which the diluted gas is discharged into the pipe assembly, wherein the inner space is connected to the pipe assembly via the second introducing pipe and the third introducing pipe in parallel; and a controller programmed to perform a series of calculation steps, the controller performing:

a first calculation step for determining an introduced purged fuel gas quantity which is equal to a quantity of the fuel gas purged and introduced from the first introduction pipe;

a second calculation step for determining a discharged fuel gas quantity which is equal to a quantity of the fuel gas to be discharged from the pipe assembly, the second calculation step comprising:

determining a flow rate of the oxidizing-off gas which flows through the pipe assembly, determining a ventilation rate equal to a ratio of a quantity of a gas in the inner space that is ventilated based at least in part on the determined flow rate of the oxidizing off-gas which flows through the pipe assembly, and determining the discharged fuel gas quantity based at least in part on the determined ventilation rate; and a third calculation step for determining a current remaining fuel gas quantity in the inner space, based at least in part on the determined introduced purged fuel gas quantity and the determined discharged fuel gas quantity; wherein the controller controls at least one of a quantity of the fuel gas to be purged in a following purging operation and a timing of the following purging operation, both of which are controlled through a fuel gas purge valve based on the determined current remaining fuel gas quantity.

2. A fuel cell system according to claim 1, wherein the third calculation step comprises determining the current remaining fuel gas quantity based on the introduced purged fuel gas quantity determined in the first calculation step and a cumulative discharged fuel gas quantity obtained by integrating the discharged fuel gas quantity determined in the second calculation step from a time of a previous purging operation getting started.

3. A fuel cell system according to claim 2, wherein the third calculation step comprises determining the current remaining fuel gas quantity by subtracting the cumulative discharged fuel gas quantity from a summation of the current remaining fuel gas quantity at a time of the previous purging operation getting started and the introduced purged fuel gas quantity after the previous purging operation getting started.

4. A fuel cell system according to claim 1, wherein the controller does not allow the following purging operation if the current remaining fuel gas quantity is larger than a predetermined fuel gas quantity.

5. A fuel cell system according to claim 2, wherein the controller does not allow the following purging operation if the current remaining fuel gas quantity is larger than a predetermined fuel gas quantity.

6. A fuel cell system according to claim 3, wherein the controller does not allow the following purging operation if the current remaining fuel gas quantity is larger than a predetermined fuel gas quantity.

7. A fuel cell system according to claim 1, further comprising a voltage measuring device for measuring a cell voltage of the fuel cell, wherein if the cell voltage measured with the voltage measuring device is lower than a predetermined voltage, the controller calculates a purgeable fuel gas quantity in the following purging operation to be done based on the current remaining fuel gas quantity and gives the fuel gas purge valve a purging direction on the purgeable fuel gas quantity in the following purging operation.

8. A fuel cell system according to claim 2, further comprising a voltage measuring device for measuring a cell voltage of the fuel cell, wherein if the cell voltage measured with the voltage measuring device is lower than a predetermined voltage, the controller calculates a purgeable fuel gas quantity in the following purging operation to be done based on the current remaining fuel gas quantity and gives the fuel gas purge valve a purging direction on the purgeable fuel gas quantity in the following purging operation.

9. A fuel cell system according to claim 3, further comprising a voltage measuring device for measuring a cell voltage of the fuel cell, wherein if the cell voltage measured with the voltage measuring device is lower than a predetermined voltage, the controller calculates a purgeable fuel gas quantity in the following purging operation to be done based on the current remaining fuel gas quantity and gives the fuel gas purge valve a purging direction on the purgeable fuel gas quantity in the following purging operation.

10. A fuel cell system according to claim 4, further comprising a voltage measuring device for measuring a cell voltage of the fuel cell, wherein if the cell voltage measured with the voltage measuring device is lower than a predetermined voltage, the controller calculates a purgeable fuel gas quantity in the following purging operation to be done based on the current remaining fuel gas quantity and gives the fuel gas purge valve a purging direction on the purgeable fuel gas quantity in the following purging operation.

11. A fuel cell system according to claim 5, further comprising a voltage measuring device for measuring a cell voltage of the fuel cell, wherein if the cell voltage measured with the voltage measuring device is lower than a predetermined voltage, the controller calculates a purgeable fuel gas quantity in the following purging operation to be done based on the current remaining fuel gas quantity and gives the fuel gas purge valve a purging direction on the purgeable fuel gas quantity in the following purging operation.

12. A fuel cell system according to claim 6, further comprising a voltage measuring device for measuring a cell voltage of the fuel cell, wherein if the cell voltage measured with the voltage measuring device is lower than a predetermined voltage, the controller calculates a purgeable fuel gas quantity in the following purging operation to be done based on the current remaining fuel gas quantity and gives the fuel gas purge valve a purging direction on the purgeable fuel gas quantity in the following purging operation.

13. A fuel cell system according to claim 1, wherein the pipe assembly comprises an air discharge pipe, and a small diameter pipe between the second introducing pipe and the third introducing pipe, a diameter of the small diameter pipe being smaller than a diameter of the air discharge pipe.

* * * * *